(12) United States Patent
Zhang et al.

(10) Patent No.: US 10,683,080 B2
(45) Date of Patent: Jun. 16, 2020

(54) SEALING DEVICE AND ASSOCIATED FLIGHT CONTROL SURFACE MECHANISM AND AIRCRAFT

(71) Applicant: AIRBUS (S.A.S.), Blagnac (FR)

(72) Inventors: Feng Zhang, Beijing (CN); Li Guo, Beijing (CN)

(73) Assignee: AIRBUS SAS, Blagnac (FR)

(*) Notice: Subject to any disclaimer, the term of this patent is extended or adjusted under 35 U.S.C. 154(b) by 398 days.

(21) Appl. No.: 15/466,743

(22) Filed: Mar. 22, 2017

(65) Prior Publication Data
US 2017/0274977 A1  Sep. 28, 2017

(30) Foreign Application Priority Data

Mar. 23, 2016  (CN) .......................... 2016 1 0169346

(51) Int. Cl.
*B64C 9/00* (2006.01)
*B64C 9/08* (2006.01)
*B64C 7/00* (2006.01)
*B64C 9/02* (2006.01)
*B64C 5/02* (2006.01)

(52) U.S. Cl.
CPC .................. *B64C 9/00* (2013.01); *B64C 5/02* (2013.01); *B64C 7/00* (2013.01); *B64C 9/02* (2013.01); *B64C 9/08* (2013.01); *Y02T 50/32* (2013.01)

(58) Field of Classification Search
CPC .... B64C 3/44; B64C 3/48; B64C 3/50; B64C 9/08; B64C 9/14; B64C 9/146; B64C 9/16; B64C 9/18; B64C 9/20; B64C 9/22; B64C 9/24; B64C 9/26; B64C 9/28; B64C 5/10
See application file for complete search history.

(56) References Cited

U.S. PATENT DOCUMENTS 2,458,896 A * 1/1949 Darby ....................... B64C 9/02
244/87
2,461,745 A * 2/1949 Lang ......................... B64C 3/50
244/130
(Continued)

FOREIGN PATENT DOCUMENTS

EP  1940680 A2  7/2008
EP  2266877 A2  12/2010

OTHER PUBLICATIONS

EP Search Report for EP17 16 2428 dated Aug. 8, 2017; 10 pp.

*Primary Examiner* — Philip J Bonzell
*Assistant Examiner* — Tye William Abell
(74) *Attorney, Agent, or Firm* — Nixon & Vanderhye P.C.

(57) ABSTRACT

The present disclosure relates to a sealing device and an associated flight control surface mechanism and an associated aircraft. According to an aspect of the present disclosure, a sealing device (100, 100') for a flight control surface mechanism (10) of an aircraft (1) is provided, the flight control surface mechanism includes a fixed part (20) and a movable wing surface (40), the movable wing surface is attached to the fixed part in a manner of being movable relative to the fixed part. The sealing device includes a fixed seal (120) attached to the fixed part and a movable seal (140, 140') attached to the movable wing surface so as to move with the movement of the movable wing surface, the movable seal and the fixed seal cooperate with each other in order to provide an aerodynamic sealing for the flight control surface mechanism.

23 Claims, 8 Drawing Sheets

(56) References Cited

U.S. PATENT DOCUMENTS

| | | | | |
|---|---|---|---|---|
| 5,388,788 A | * | 2/1995 | Rudolph | B64C 7/00 |
| | | | | 244/212 |
| 5,622,336 A | * | 4/1997 | Chavanne | B64C 7/00 |
| | | | | 244/129.1 |
| 7,051,982 B1 | | 5/2006 | Johnson | |
| 2007/0252040 A1 | * | 11/2007 | Kordel | B64C 7/00 |
| | | | | 244/123.1 |
| 2010/0288887 A1 | * | 11/2010 | Parker | B64C 7/00 |
| | | | | 244/213 |
| 2010/0327121 A1 | * | 12/2010 | McAlinden | B64C 7/00 |
| | | | | 244/215 |
| 2014/0001309 A1 | * | 1/2014 | Tieys | B64C 9/02 |
| | | | | 244/99.3 |

* cited by examiner

SEALING DEVICE AND ASSOCIATED FLIGHT CONTROL SURFACE MECHANISM AND AIRCRAFT

This application claims priority to Chinese Patent Application No. 201610169346.3, titled "SEALING DEVICE AND ASSOCIATED FLIGHT CONTROL SURFACE MECHANISM AND AIRCRAFT", filed with the Chinese State Intellectual Property Office on Mar. 23, 2016, which is incorporated by reference in its entirety herein.

FIELD OF THE DISCLOSURE

The present disclosure relates to the field of aircraft, and more particularly, to a sealing device improved in aerodynamic sealing, a flight control surface mechanism including the sealing device and an aircraft including the flight control surface mechanism.

BACKGROUND OF THE DISCLOSURE

In an aircraft such as an airplane, various flight control surface mechanisms configured to achieve corresponding functions are provided. For example, those flight control surface mechanisms include: a vertical tail with a rudder configured to correct the heading of the airplane and allow the airplane to steer at a small angle; a horizontal tail with an elevator configured to realize a head upward flight and a head downward flight of the airplane; and a flap mechanism (consisting of a flap and a corresponding section of a wing) with a flap configured to achieve a large lift force and a good maneuverability under low speed. The flight control surface mechanism typically includes a fixed part and a movable wing surface attached to the fixed part in a manner of being movable (for example pivotable) relative to the fixed part, for example, the vertical tail has a vertical tail plane as the fixed part and a rubber as the movable wing surface.

Between the fixed part and the movable wing surface, it is necessary to maintain a good aerodynamic sealing in respective positioning states (particularly forward and reverse limit positioning states) of the movable wing surface relative to the fixed part, so as to improve the efficiency of the movable wing surface and the aerodynamic performance of the whole flight control surface mechanism.

In particularly, in some cases, in order to, for example, avoid interfering with related fixing parts of the flight control surface mechanism, a cut-out is provided at an edge portion of the movable wing surface. Such cut-out may be exposed to the outside as the movable wing surface is in a pivotal limit position relative to the fixed part, such that the aerodynamic performance is impaired. Thus, it is advantageous to improve the aerodynamic sealing of the cut-out, for example, when in the pivotal limit position.

Here, it should be noted that the technical contents provided in this section aim to facilitate understanding of the present disclosure by the skilled in the art, and do not necessarily constitute the prior art.

SUMMARY OF THE DISCLOSURE

Provided in this section is a general summary of the present disclosure, and is not the full scope of the present disclosure or the full disclosure of all features of the present disclosure.

An object of the present disclosure is to provide a sealing device which is able to effectively maintain a good aerodynamic sealing of a flight control surface mechanism.

Another object of the present disclosure is to provide a sealing device which is able to effectively ensure the efficiency of a movable wing surface and also the aerodynamic performance of the flight control surface mechanism while preventing the movable wing surface and a corresponding fixing part from interfering with each other.

Another object of the present disclosure is to provide a sealing device which is able to avoid an excessive flutter of a corresponding seal.

Another object of the present disclosure is to provide a sealing device which is able to reduce the friction between a movable wing surface and a corresponding seal and thus reduce the damage to the coating of the movable wing surface.

Other objects of the present disclosure are to provide a flight control surface mechanism including the sealing device described above and an aircraft including the flight control surface mechanism described above.

In order to achieve one or more of the above objects, according to an aspect of the present disclosure, a sealing device for a flight control surface mechanism of an aircraft is provided, the flight control surface mechanism including a fixed part and a movable wing surface, the movable wing surface being attached to the fixed part in a manner of being movable relative to the fixed part. The sealing device includes a fixed seal attached to the fixed part and a movable seal attached to the movable wing surface so as to move with the movement of the movable wing surface, the movable seal and the fixed seal cooperate with each other in order to provide an aerodynamic sealing for the flight control surface mechanism.

In the above sealing device, the movable wing surface is arranged behind the fixed part in the aircraft flight direction, the fixed seal is attached to a trailing edge of the fixed part, and the movable seal is attached to a leading edge of the movable wing surface.

In the above sealing device, a cut-out is provided at the leading edge of the movable wing surface, the movable seal is arranged at the cut-out for covering the cut-out.

In the above sealing device, the cut-out has a substantially rectangular shape or a substantially circular-arc shape, and correspondingly the movable seal has a substantially rectangular shape or a substantially circular-arc shape.

In the above sealing device, the fixed seal is attached to the trailing edge of the fixed part at a position corresponding to the cut-out, and the length of the fixed seal in the lengthwise direction of the flight control surface mechanism is greater than the length of the cut-out in the lengthwise direction of the flight control surface mechanism.

In the above sealing device, the sealing size of the fixed seal in the anterior-posterior direction of the flight control surface mechanism is smaller than the sealing size of the movable seal in the anterior-posterior direction of the flight control surface mechanism.

In the above sealing device, the sealing size of the fixed seal in the anterior-posterior direction of the flight control surface mechanism and the sealing size of the movable seal in the anterior-posterior direction of the flight control surface mechanism are set such that: even when the movable wing surface moves to a limit position in a direction allowing a corresponding side of the movable wing surface to be away from a corresponding side of the fixed part, the fixed seal and the movable seal are overlapped with each other.

In the above sealing device, the flight control surface mechanism further includes a hinge and a fixed part-side hinge rib, the hinge allows the movable wing surface to pivot relative to the fixed part, the fixed part-side hinge rib is configured to support the hinge and is fixedly connected to the fixed part, and the cut-out is configured to prevent the movable wing surface and the fixed part-side hinge rib from interfering with each other in the process of the pivotal movement.

In the above sealing device, the sealing device, is arranged such that the fixed seal and the movable seal are spaced apart at a predetermined gap without contacting with each other.

In the above sealing device, the movable seal and the fixed seal are made of a flexible material.

In the above sealing device, the sealing device is provided with an avoiding mechanism, such that in the process of the movement of the movable wing surface relative to the fixed part, the movable seal is able to avoid a corresponding fixing part of the flight control surface mechanism.

In the above sealing device, each of other edges than a front edge of the movable seal is fixedly connected to a cut-out edge, which defines the cut-out, of the leading edge of the movable wing surface.

In the above sealing device, the avoiding mechanism is embodied as a dividing part, which is located at the movable seal and extends from the front edge substantially in the anterior-posterior direction of the flight control surface mechanism.

In the above sealing device, the dividing part is a single dividing part extending over substantially the entire movable seal substantially in the anterior-posterior direction of the flight control surface mechanism, such that the movable seal is divided into a first movable seal and a second movable seal separated front each other, and a divided end of the first movable seal and a divided end of the second movable seal facing to each other are in contact with each other.

In the above sealing device, the avoiding mechanism includes a pushing member, which is configured to abut against and push away the movable seal when the movable wing surface moves in a direction allowing a corresponding side of the movable wing surface to be close to a corresponding side of the fixed part.

In the above sealing device: the pushing member is directly connected to the fixed part; or, the flight control surface mechanism further includes a hinge and a fixed part-side hinge rib, the hinge allows the movable wing surface to pivot relative to the fixed part, the fixed part-side hinge rib is configured to support the hinge and is fixedly connected to the fixed part, and the pushing member is attached to the fixed part-side hinge rib so as to be indirectly connected to the fixed part.

In the above sealing device, the pushing member is attached to the fixed part-side hinge rib, and the pushing member includes a substantially circular-arc-shaped hook bent towards the side of the movable wing surface, the hook is configured to abut against and push away the movable seal.

In the above sealing device, the pushing member further includes a base and a concave, the base is attached to the fixed part-side hinge rib, and the concave is located between the base and a terminal end of the hook.

In the above sealing device, a front edge of the movable seal is bent to have a bent part configured to be abutted by the hook.

In the above sealing device, the cut-out has a substantially rectangular shape, and correspondingly the movable seal has a substantially rectangular shape and includes the front edge, a rear edge and two side edges, and only the rear edge is fixedly connected to a back edge of the cut-out.

In the above sealing device, the flight control surface mechanism is a vertical tail, and the fixed part is a vertical tail plane and the movable wing surface is a rudder.

In the above sealing device, the fixed part includes a first fixed aerodynamic surface and a second fixed aerodynamic surface substantially symmetrical with respect to a vertical median plane of the flight control surface mechanism, the movable wing surface includes a first movable aerodynamic surface and a second movable aerodynamic surface substantially symmetrical with respect to the vertical median plane of the flight control surface mechanism, and the sealing device includes a first sealing device and a second sealing device substantially symmetrical with respect to the vertical median plane of the flight control surface mechanism, the first sealing device is arranged between the first fixed aerodynamic surface and the first movable aerodynamic surface, and the second sealing device is arranged between the second fixed aerodynamic surface and the second movable aerodynamic surface.

In the above sealing device, the first sealing device includes a plurality of first sealing devices arranged along the lengthwise direction of the flight control surface mechanism, and correspondingly, the second sealing device includes a plurality of second sealing devices arranged along the lengthwise direction of the flight control surface mechanism.

In order to achieve one or more of above objects, according to another aspect of the present disclosure, a flight control surface mechanism for an aircraft is provided. The flight control surface mechanism includes the sealing device as described above.

In order to achieve one or more of above objects, according to another aspect of the present disclosure, an aircraft is provided. The aircraft includes the flight control surface mechanism as described above.

According to the present disclosure, since the sealing device is comprised of the fixed seal and the movable seal cooperating with each other, compared with the related technical solution in which the sealing device only includes the fixed seal (for example, a short fixed seal), a gap or cut-out can be reliably avoided from being exposed between the movable wing surface and the fixed part when the movable wing surface is for example in the pivotal limit position. Thus, a good aerodynamic sealing of the flight control surface mechanism can be effectively maintained (i.e., providing an aerodynamic sealing to the gap or cut-out so as to provide a relatively smooth air flow path on an aerodynamic surface of the flight control surface mechanism), and the efficiency of the movable wing surface and then the aerodynamic performance of the flight control surface mechanism can be effectively improved.

In addition, since the sealing device is comprised of the fixed seal and the movable seal cooperating with each other, use of a single long and thin seal (particularly, a fixed seal) can be avoided and thus an excessive flutter of the fixed seal upstream in the flight direction can be avoided. Moreover, since the short fixed seal cooperating with the movable seal could be used, the friction between the fixed seal and the leading edge of the movable wing surface can be reduced (particularly, when the movable wing surface is in the pivotal limit position) and thus the damage to the coating (for example painting) of the leading edge can be reduced.

BRIEF DESCRIPTION OF THE DRAWINGS

The features and advantages of one or more embodiments of the present disclosure will become easier to be understood by way of the following description in conjunction with accompany drawings, in which.

DETAILED DESCRIPTION

In the following, the present disclosure will be described in detail by way of exemplary embodiments in conjunction with accompany drawings. The following detailed description of the present disclosure is only for the purpose of illustration and in no way to limit the present disclosure and its application or use.

Figure 1:
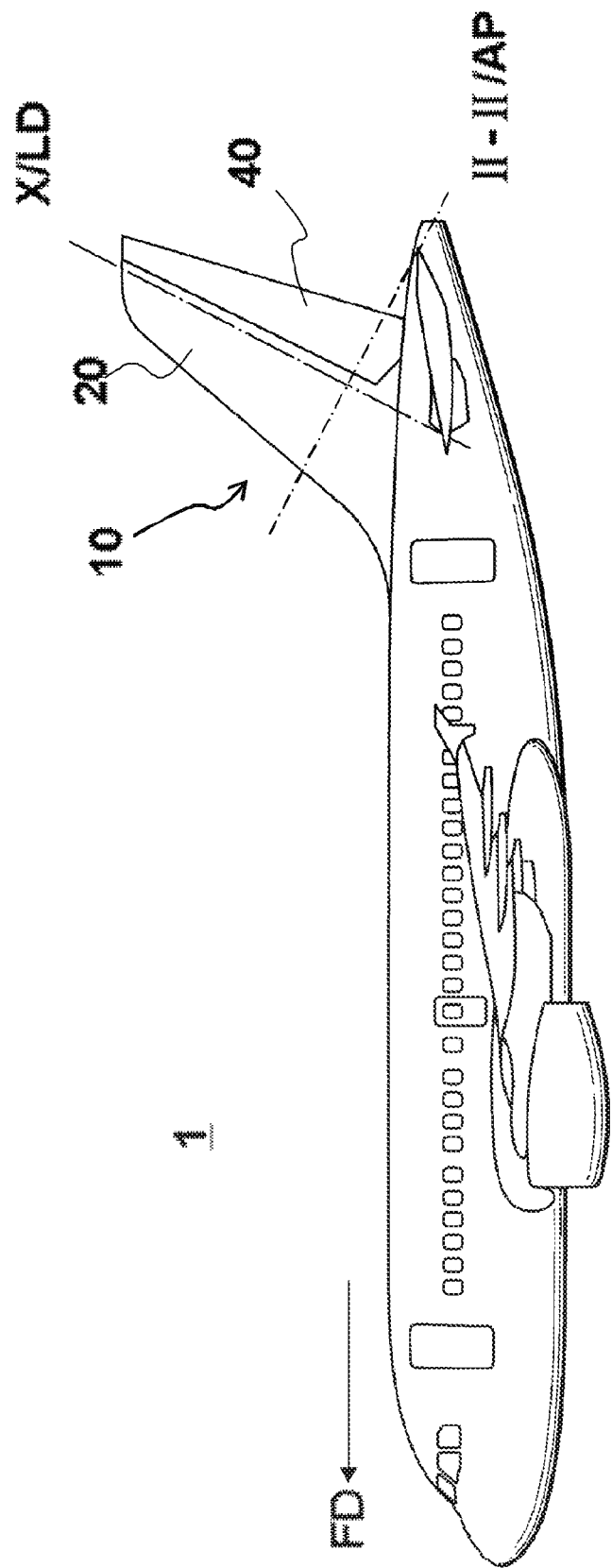
FIG. 1 is a side view showing an airplane to which a sealing device according to the present disclosure is applied.

With reference to FIG. 1 (FIG. 1 is a side view showing an airplane to which a sealing device according to the present disclosure is applied), an airplane 1 (corresponding to an aircraft according to the present disclosure) to which a sealing device according to the present disclosure is applied may include a vertical tail 10 (corresponding to a flight control surface mechanism according to the present disclosure), and the vertical tail 10 may in turn include a vertical tail plane (VTP) 20 (corresponding to a fixed part according to the present disclosure) and a rudder 40 (corresponding to a movable wing surface according to the present disclosure) configured to correct the heading of the airplane and allow the airplane to steer at a small angle. The airplane may define a flight direction FD which substantially corresponds to a lengthwise direction of the airplane fuselage. Here, it needs to be noted that although the present disclosure is described by taking the vertical tail 10 as an example of the flight control surface mechanism, the present disclosure may be applied to other flight control surface mechanisms, which include, but are not limited to, a horizontal tail with an elevator configured to realize a head upward flight and a head downward flight of the airplane, and a flap mechanism (which consists of a flap and a corresponding section of a wing, and may include a leading edge flap mechanism and a trailing edge flap mechanism) with a flap configured to achieve a large lift force and a good maneuverability under low speed.

Figure 2:
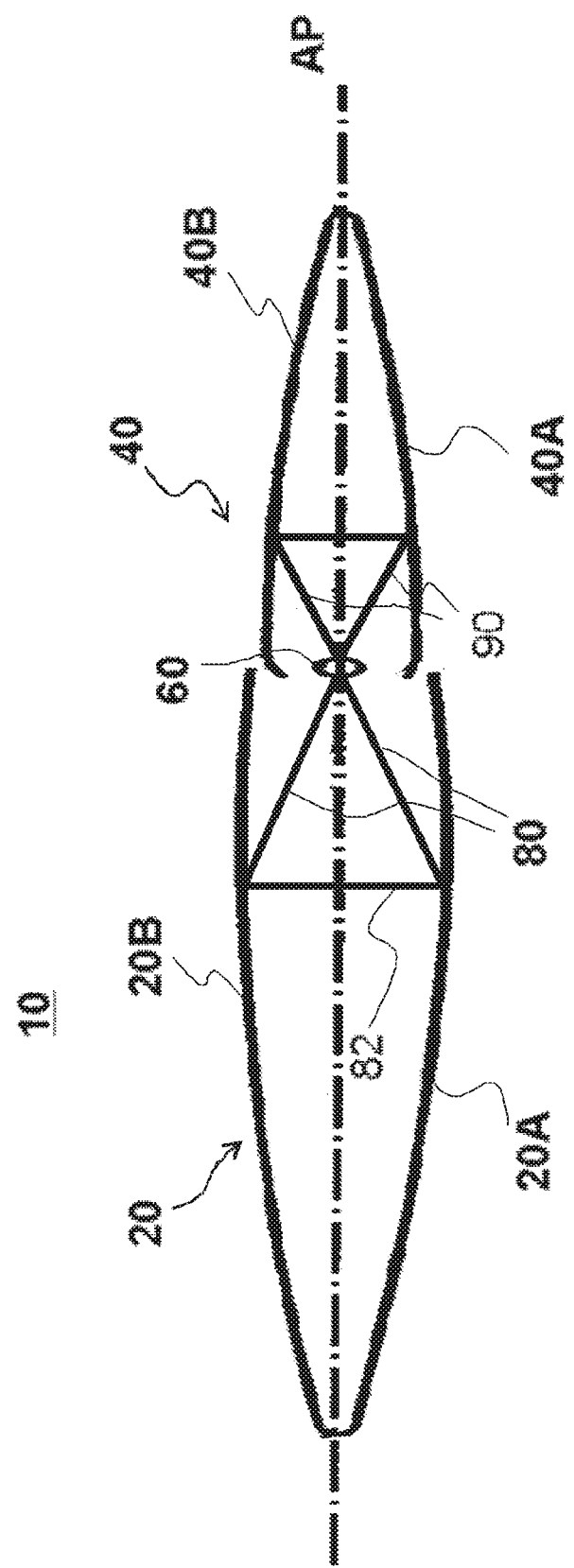
FIG. 2 is a schematic section view taken along a line II-II in FIG. 1 for showing the vertical tail to which the sealing device according to the present disclosure is applied.

With reference to FIG. 2 (FIG. 2 is a schematic section view taken along a line II-II in FIG. 1 for showing the vertical tail to which the sealing device according to the present disclosure is applied), the rudder 40 is attached to the VTP 20 in a manner of being movable relative to the VTP 20. In some examples, the rudder 40 is attached to the VTP 20 in a manner of being pivotable relative to the VTP 20. In other examples, instead of or in addition to the pivoting, other movements may be made relative to the VTP 20 by the rudder 40. For example, the rudder 40 may translate forward and backward relative to the VTP 20 and at the same time may pivot relative to the VTP 20. Furthermore, the rudder 40 may be embodied as a one-piece rudder, and may also be embodied as a two-piece (upper and lower pieces) or a multi-piece rudder 40 as required.

As shown FIG. 2, the vertical tail 10 may further include a hinge (pivot) 60 and a hinge rib (fixed part-side hinge rib) 80. The hinge 60 allows the rudder 40 to pivot relative to the VTP 20, and the hinge ribs 80 are configured to support the hinge 60 and fixedly connected to the VTP 20. In the example shown, the hinge ribs 80 are fixedly connected to a transverse rib 82, and the transverse rib 82 is in turn fixedly connected to an inner wall surface of the VTP 20, thereby achieving a fixed connection of the hinge ribs 80 with the VTP 20. The vertical tail 10 may be further provided with a hinge rib (movable wing surface-side hinge rib) 90 similar to the hinge rib 80 in structure and function, and the hinge ribs 80 and the hinge ribs 90 are configured to support the hinge 60 together. Thus, via the hinge 60, the rudder 40 is able to pivot relative to the VTP 20 about a pivotal axis X (see FIG. 1) defined by the hinge 60. Thereby, the rudder 40 is allowed to be controllably positioned in desired pivotal positions relative to the VTP 20 by way of an associated actuator (not shown). The pivotal positions for example include: a neutral pivotal position as shown in FIG. 2; a left pivotal limit position to which the rudder 40 pivots downward to the greatest extent from the neutral pivotal position as shown in FIG. 2—for example pivots towards the left by 20 to 30 degrees; and a right pivotal limit position to which the rudder 40 pivots upward to the greatest extent from the neutral pivotal position as shown in FIG. 2—for example pivots towards the right by 20 to 30 degrees.

In some examples, the hinge 60 and its respective supporting structures (including the hinge ribs 80 and the hinge ribs 90) may be respectively provided in plurality along a lengthwise direction LD.

The vertical tail 10 may define: the lengthwise direction LD substantially corresponding to the pivotal axis X; and an anterior-posterior direction AP (see FIG. 2) substantially perpendicular to the lengthwise direction LD.

With reference to FIG. 2, the VTP 20 may include a first (left) fixed aerodynamic surface 20A and a second (right) fixed aerodynamic surface 20B substantially symmetrical with respect to a vertical median plane (the anterior-posterior direction AP is in the vertical median plane) of the vertical tail 10, and the rudder 40 may include a first (left) movable aerodynamic surface 40A and a second (right) movable aerodynamic surface 40B substantially symmetrical with respect to the vertical median plane of the vertical tail 10.

Figure 3A:
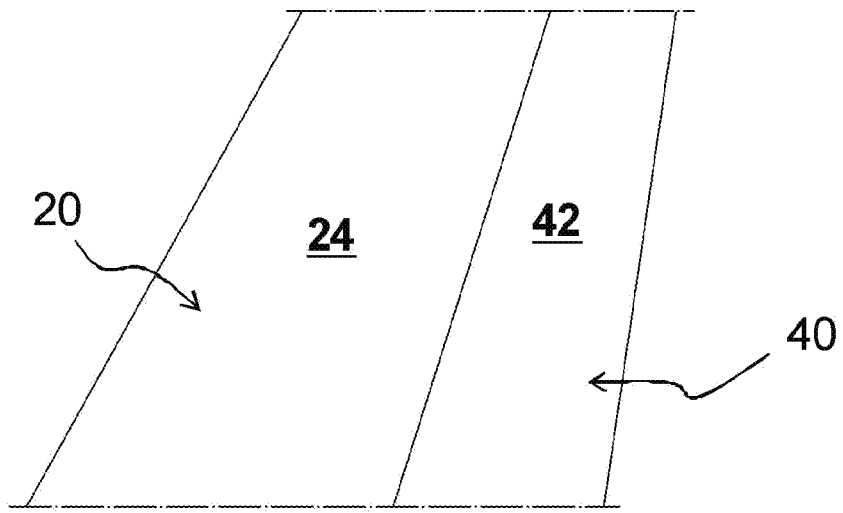
FIGS. 3A and 3B are left side views respectively showing the vertical tail with the rubber located at the neutral pivotal position and at the right pivotal limit position.
Figure 3B:
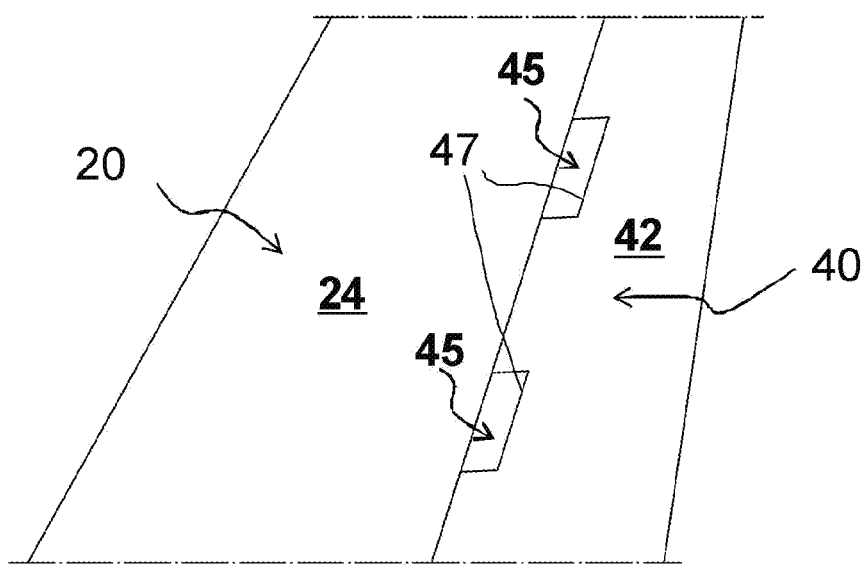

In some cases, in order to avoid the interference between a leading edge 42 of the rudder 40 and the hinge ribs 80 as the rudder 40 is in for example the left or right pivotal limit position, it may be considered to provide a cut-out 45 at a position, corresponding to the hinge rib 80, of the leading edge 42 of the rudder 40. With reference to FIGS. 3A and 3B (FIGS. 3A and 3B are left side views respectively showing the vertical tail with the rubber located at the neutral pivotal position and at the right pivotal limit position), the cut-out 45 may be covered by a trailing edge 24 of the VTP 20 as the rudder 40 is in the neutral position (as shown in FIG. 3A), and the cut-out 45 may be exposed to the outside as the rudder 40 is in the right pivotal limit position (as shown in FIG. 3B). Here, in the case that the hinge 60 and its respective supporting structures are respectively provided in plurality along the lengthwise direction LD, the cut out 45 may correspondingly be provided in plurality along the lengthwise direction LD.

The setting position and size of the cut-out 45 are set such that: even when the rudder 40 moves to the left or right pivotal limit position, the leading edge 42 of the rudder 40 and the hinge ribs 80 do not interfere with each other. In a preferable example, the setting position and size of the cut-out 45 are set such that: when the rudder 40 moves to the left or right pivotal limit position, the leading edge 42 of the rudder 40 and the hinge ribs 80 are close to each other but do not interfere with each other (preferably, are as close as possible to each other but do not interfere with each other, that is, just do not interfere with each other).

According to the present disclosure, a sealing device configured to provide an aerodynamic sealing for the vertical tail 10 (i.e., provide a relatively smooth air flow path so as to improve the efficiency of the vertical tail 10) is provided. The sealing device may be provided in plurality along the lengthwise direction LD corresponding to the cut-out 45 and the hinge 60. The sealing device may include a first (left) sealing device provided between the left fixed aerodynamic surface 20A and the left movable aerodynamic surface 40A and a second (right) sealing device provided between the right fixed aerodynamic surface 20B and the right movable aerodynamic surface 40B. Here, since the left fixed aerodynamic surface 20A and the right fixed aerodynamic surface 20B are substantially symmetrical and may have substantially similar structures, the left movable aerodynamic surface 40A and the right movable aerodynamic surface 40B are substantially symmetrical and may have substantially similar structures, and the left sealing device and the right sealing device may be substantially symmetrical and may have substantially similar structures, in the following, for the purpose of conciseness, only the left sealing device, the left fixed aerodynamic surface 20A and the left movable aerodynamic surface 40A will be described for example. Here, it needs to be noted that the present disclosure is not limited to the symmetrical arrangement of the left sealing device and the right sealing device, and may also encompass other suitable arrangements (for example, a single-sided arrangement of the sealing device).

Here, it needs to be noted that, for the left fixed aerodynamic surface 20A and the left movable aerodynamic surface 40A, the leftward direction of the rudder 40 corresponds to a forward direction which allows a corresponding side (i.e., the left movable aerodynamic surface 40A) of the rudder 40 to be close to a corresponding side (i.e., the left fixed aerodynamic surface 20A) of the VTP 20 and the left pivotal limit position corresponds to a forward limit position, and the rightward direction of the rudder 40 corresponds to a reverse direction which allows the corresponding side of the rudder 40 to be away from the corresponding side of the VTP 20 and the right pivotal limit position corresponds to a reverse limit position. Differently, for the right fixed aerodynamic surface 20B and the fight movable aerodynamic surface 40B, the leftward direction corresponds to a reverse direction and the left pivotal limit position corresponds to a reverse limit position, and the rightward direction corresponds to a forward direction and the right pivotal limit position corresponds to a forward limit position.

Figure 4:
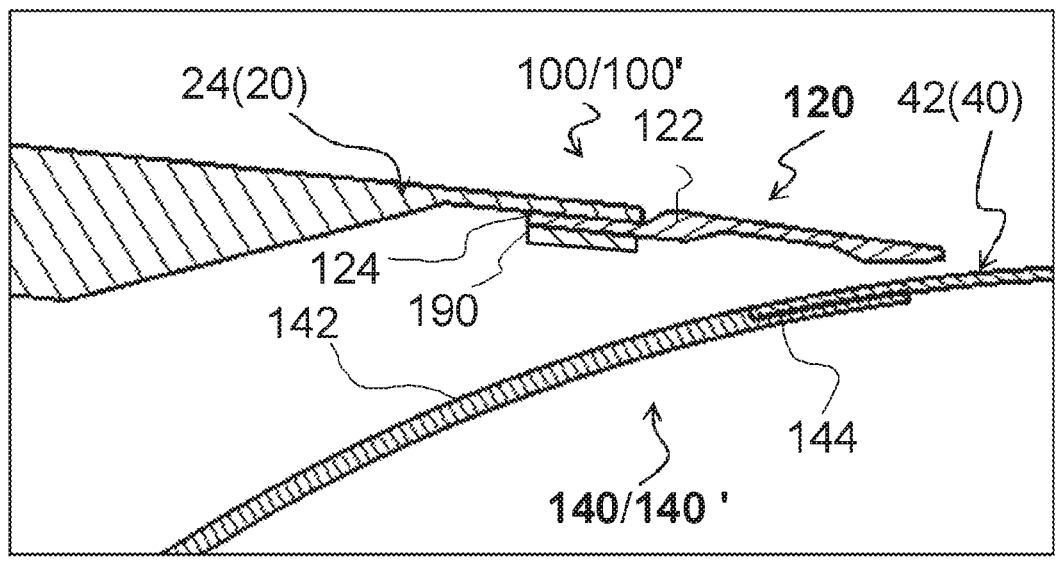
FIG. 4 is a schematic section view showing the sealing device according to the present disclosure.
Figure 5:
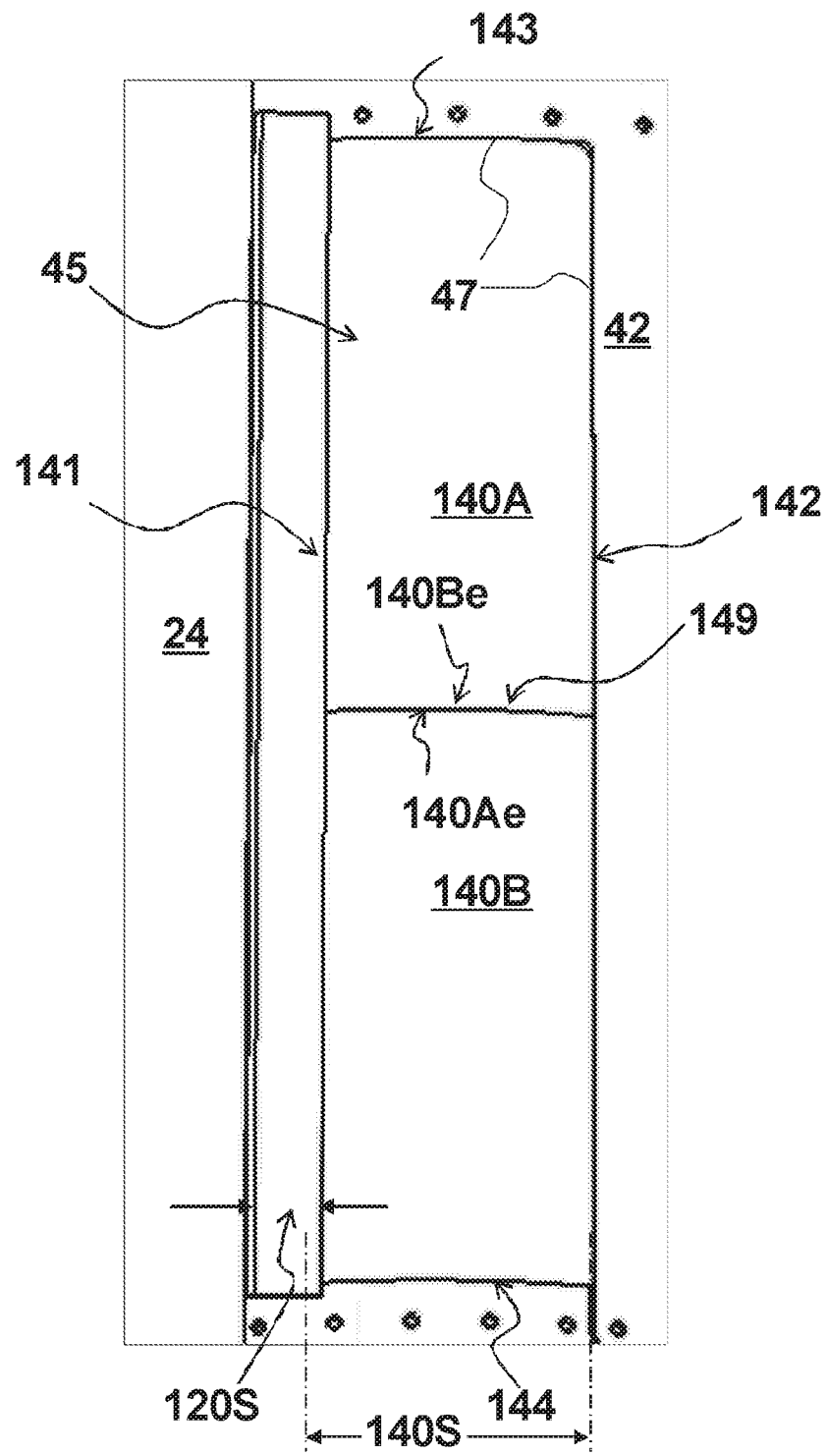
FIGS. 5 and 6 are respectively a side view and a perspective view showing a sealing device according to a first embodiment of the present disclosure.
Figure 6:
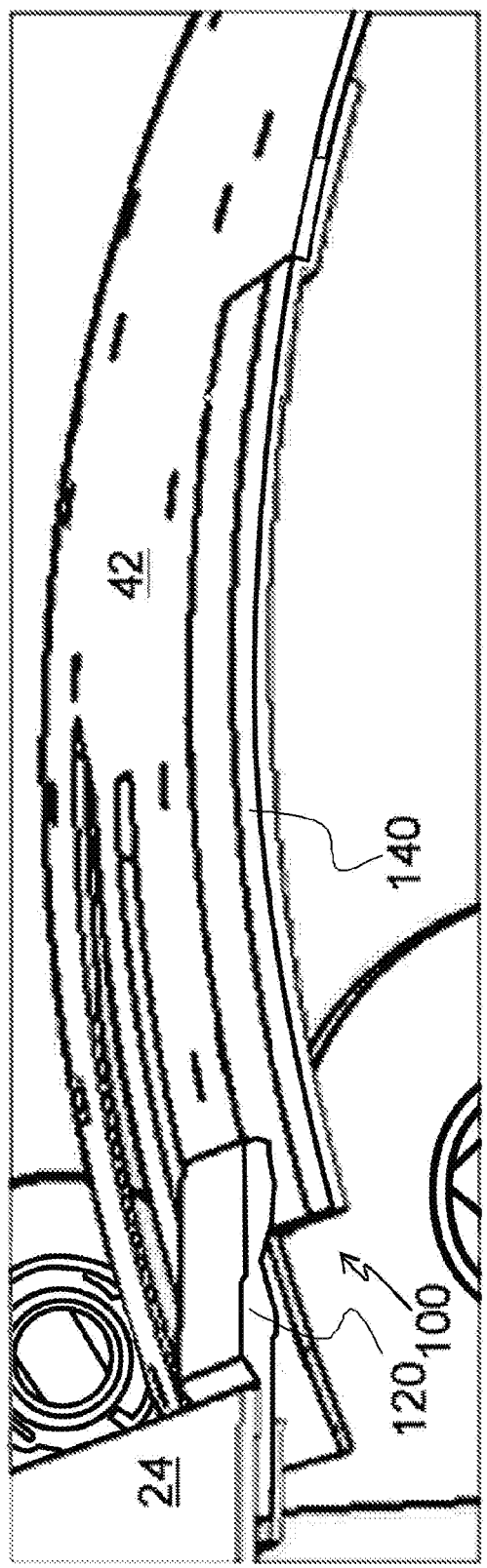

A sealing device 100 according to a first embodiment of the present disclosure will be described below with reference to FIGS. 4 to 6, in which FIG. 4 is a schematic section view showing the sealing device according to the present disclosure, and FIGS. 5 and 6 are respectively a side view and a perspective view showing a sealing device according to a first embodiment of the present disclosure.

The sealing device 100 may include a fixed seal 120 attached to the VTP 20 and a movable seal 140 attached to the rudder 40 so as to move with the movement of the rudder 40. The movable seal 140 is configured to cooperate with the fixed seal 120 so as to provide an aerodynamic sealing for the vertical tail 10. The fixed seal 120 may be attached to the trailing edge 24 of the VTP 20, and the movable seal 140 may be attached to the leading edge 42 of the rudder 40.

In the example shown, with reference to FIG. 4, the fixed seal 120 includes a body part 122 and an attached part 124. The body part 122 is configured to be attached to the trailing edge 24 (for example, attached to an inner surface of the trailing edge 24), such that an outer surface of the trailing edge 24 is substantially flush with an outer surface of the body part 122. In addition, as shown in FIG. 4, a mounting plate (for example, a metal mounting plate) 190 may be provided, so that the attached part 124 may be sandwiched between the mounting plate 190 and the trailing edge 24 so as to achieve a firmer installation of the fixed seal 120. Similarly, with reference to FIG. 6, the movable seal 140 may include a body part 142 and an attached part 144. The body part 142 is configured to be attached to the leading edge 42 (for example, attached to an inner surface of the leading edge 42), such that an outer surface of the leading edge 42 is substantially flush with an outer surface of the body part 142.

In some examples, the attachments between the fixed seal 120 and the trailing edge 24 and between the movable seal 140 and the leading edge 42 may be achieved by riveting, thread connection, gluing and other means.

With reference to FIG. 5, the movable seal 140 may be arranged in the cut-out 45. In the example shown, the cut-out 45 has a substantially rectangular shape, and correspondingly the movable seal 140 has a substantially rectangular shape. In this regard, it can be conceived that the cut-out 45 and the movable seal 140 may have other suitable shapes, for example, the cut-out 45 may have a substantially circular-arc shape, and correspondingly the movable seal 140 may have the substantially circular-arc shape. In addition, it can be further conceived that the movable seal 140 is not only arranged in the cut-out 45, but instead arranged on the whole leading edge 42 of the rudder 40 along the lengthwise direction LD.

The fixed seal 120 may be attached to the trailing edge 24 of the VTP 20 at a position (a position in the lengthwise direction LD) corresponding to the cut-out 45. In a preferable example, the length of the fixed seal 120 in the lengthwise direction LD is greater than the length of the cut-out 45 in the lengthwise direction LD, such that the fixed seal 120 covers (overlaps) the cut-out 45 as seen from the front in the aircraft flight direction FD. In this way, an effective aerodynamic sealing achieved in the whole area of the cut-out 45 in the lengthwise direction LD by way of the fixed seal 120 can be ensured, thereby improving the aerodynamic performance of the flight control surface mechanism. In other examples, it can be conceived that the fixed seal 120 may be arranged on the whole trailing edge 24 of the VTP 20 along the lengthwise direction LD or arranged in other suitable ways.

The sealing size (the effective sealing size, i.e., the size of the body part 122) 120S of the fixed seal 120 in the anterior-posterior direction AP may be smaller than the sealing size (the effective sealing size, i.e., the size of the body part 142) 140S of the movable seal 140 in the anterior-posterior direction AP. By setting the size of the fixed seal 120 in the anterior-posterior direction AP to be smaller, an excessive flutter of the fixed seal 120 upstream in the flight direction FD can be avoided, and the friction between the fixed seal 120 and the leading edge 42 of the rudder 40 can be reduced (particularly when the rudder 40 is in the left pivotal limit position at this point, a gap between the fixed seal 120 and the leading edge 42 of the rudder 40 may become small or the fixed seal 120 and the leading edge 42 of the rudder 40 may even be in contact with each other) and thus the damage to the coating (for example painting) of the leading edge 42 can be reduced.

The sealing size 120S of the fixed seal 120 in the anterior-posterior direction AP and the sealing size 140S of the movable seal 140 in the anterior-posterior direction AP may be set such that: even when the rudder 40 moves to the right (reverse) pivotal limit position in the rightward direction (reverse direction), the fixed seal 120 and the movable seal 140 are (preferably, in an appropriate degree, for example, in a small degree of overlapping) overlapped with each other (see FIG. 6). In this way, it can be ensured that a reliable aerodynamic sealing of the flight control surface mechanism can be maintained in the reverse pivotal limit position.

The movable seal 140 and the fixed seal 120 may be made of a flexible material (such as rubber) so that for example the movable seal 140 can be biased or pushed away by a pushing member as described below. In a preferable example, the movable seal 140 and the fixed seal 120 are made of a material with a larger flexibility than that of the material of which the leading edge 42 of the rudder 40 and the trailing edge 24 of the VTP 20 are made. In this way, the aerodynamic sealing of the sealing device 100 can be improved, an improper friction between the sealing device 100 and the trailing edge 24 and the leading edge 42 can be avoided, and the damage to the hinge ribs 80 by the movable seal 140 when the movable seal 140 is in contact with the hinge ribs 80 can be avoided due to the flexibility and deformability of the movable seal 140.

In some examples, the sealing device 100 is arranged such that the fixed seal 120 and the movable seal 140 can be spaced apart at a predetermined gap without contacting with each other while the fixed seal 120 is overlapped with the movable seal 140. In this way, a smooth movement of the rudder 40 can be ensured while ensuring an appropriate aerodynamic sealing.

In the sealing device 100 according to the first embodiment, other edges (in the case that the movable seal 140 has a substantially rectangular shape, other edges include a back edge 142, an upper edge 143 and a lower edge 144) than a front edge 141 of the movable seal 140 may be fixedly connected to a cut-out edge 47, which defines the cut-out 45, of the leading edge 42 of the rudder 40.

The movable seal 140 may have a dividing part 149 extending from the front edge 141 substantially in the anterior-posterior direction AP of the vertical tail 10 (for example, the dividing part 149 may be formed by dividing the one-piece movable seal 140). In a preferable example, as shown in FIG. 5, the dividing part 149 is a single dividing part extending over substantially the entire movable seal 140 substantially in the anterior-posterior direction AP of the flight control surface mechanism 10, such that the movable seal 140 is divided into a first movable seal 140A and a second movable seal 140B. The single dividing part 149 may be located substantially at a middle position (a position substantially corresponding to the hinge ribs 80) of the movable seal 140 in the lengthwise direction LD. In addition, a divided end 140Ae of the first movable seal 140A and a divided end 140Be of the second movable seal 140B facing to each other may be in contact with each other. With the dividing part 149, when the rudder 40 moves towards the left pivotal limit position, the hinge ribs 80 are allowed to be inserted into the dividing part 149 to push away the first movable seal 140A and the second movable seal 140B, thereby allowing the rudder 40 to smoothly move to a desired pivotal position (including the left pivotal limit position). On the other hand, when the movable seal 140 is changed to be in the neutral pivotal position or the right pivotal limit position, the movable seal 140 may return to its original state (flush state) by itself for example by way of the flexibility and elasticity of its material, thereby ensuring the aerodynamic sealing of the movable seal 140. In this regard, for the application of the vertical tail, the movable seal 140 is oriented vertically, which facilitates returning of the first movable seal 140A and the second movable seal 140B to their original states. Here, it needs to be noted that in the first embodiment, the dividing part 149 corresponds to an avoiding mechanism according to the present disclosure.

In the sealing device 100 according to the first embodiment of the present disclose at least the following beneficial technical effects can be achieved.

Since the sealing device 100 is comprised of the fixed seal 120 and the movable seal 140 cooperating with each other, compared with the related technical solution in which the sealing device only includes the fixed seal (for example, a short fixed seal), a gap or cut-out can be reliably avoided from being exposed between the movable wing surface and the fixed part when the movable wing surface is for example in the pivotal limit position. Thus, a good aerodynamic sealing of the flight control surface mechanism can be effectively maintained (i.e., providing an aerodynamic sealing to the gap or cut-out so as to provide a relatively smooth air flow path on an aerodynamic surface of the flight control surface mechanism), and the efficiency of the movable wing surface and then the aerodynamic performance of the flight control surface mechanism can be effectively improved.

In addition, since the sealing device 100 is comprised of the fixed seal 120 and the movable seal 140 cooperating with each other, use of a single long and thin seal (particularly, a fixed seal) can be avoided and thus an excessive flutter of the fixed seal 120 upstream in the flight direction FD can be avoided. Moreover, since the short fixed seal 120 cooperating with the movable seal 140 could be used, the friction between the fixed seal 120 and the leading edge of the movable wing surface can be reduced (particularly, when the movable wing surface is in the pivotal limit position) and thus the damage to the coating (for example painting) of the leading edge can be reduced.

Figure 7A:
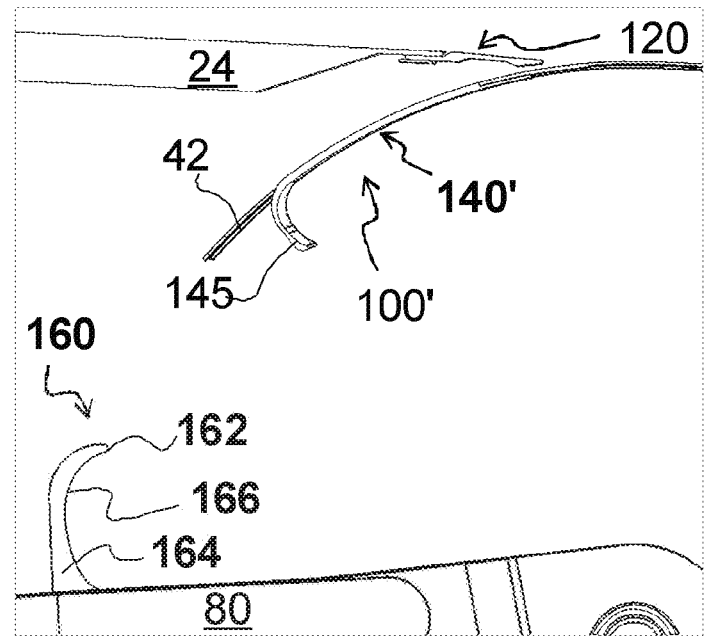
FIGS. 7A and 7B are schematic perspective views respectively showing a sealing device according to a second embodiment of the present disclosure with a rubber located at a neutral pivotal position and at a left pivotal limit position.
Figure 7B:
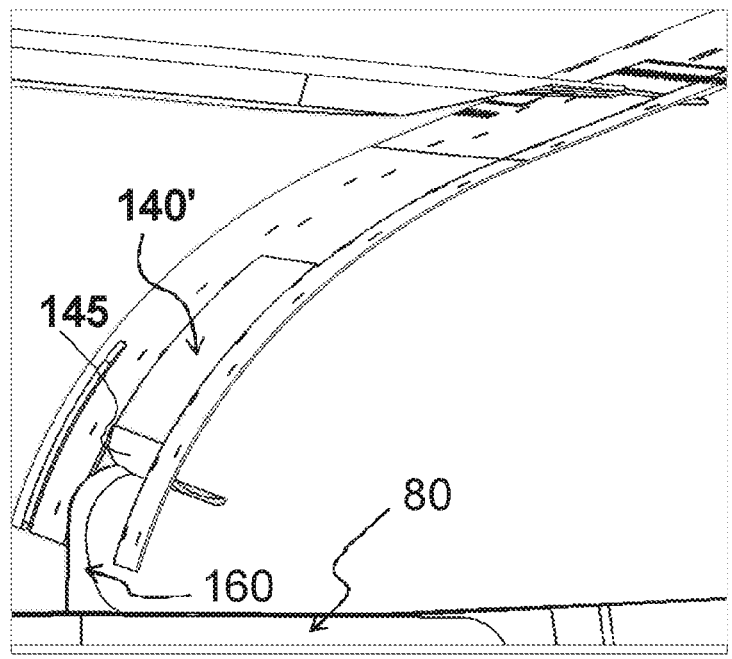
Figure 8:
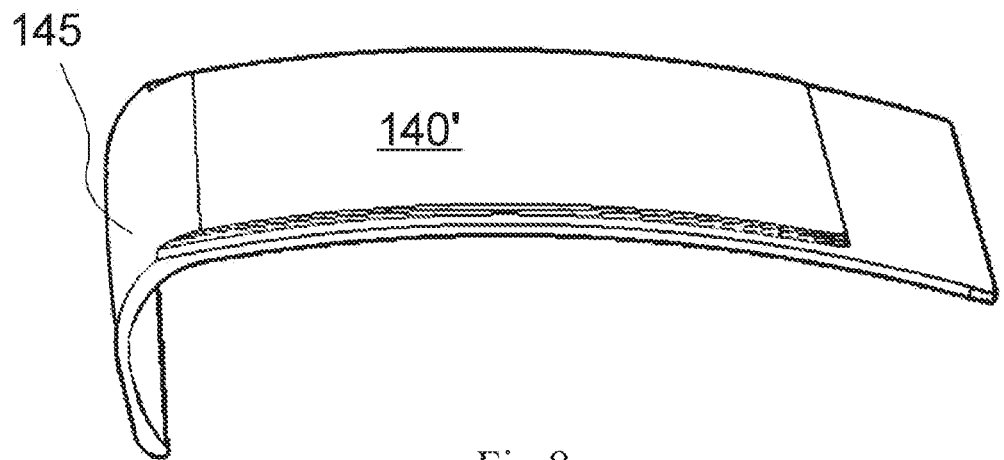
FIG. 8 is a perspective view showing a portion of a movable seal according to the second embodiment of the present disclosure.
Figure 9:
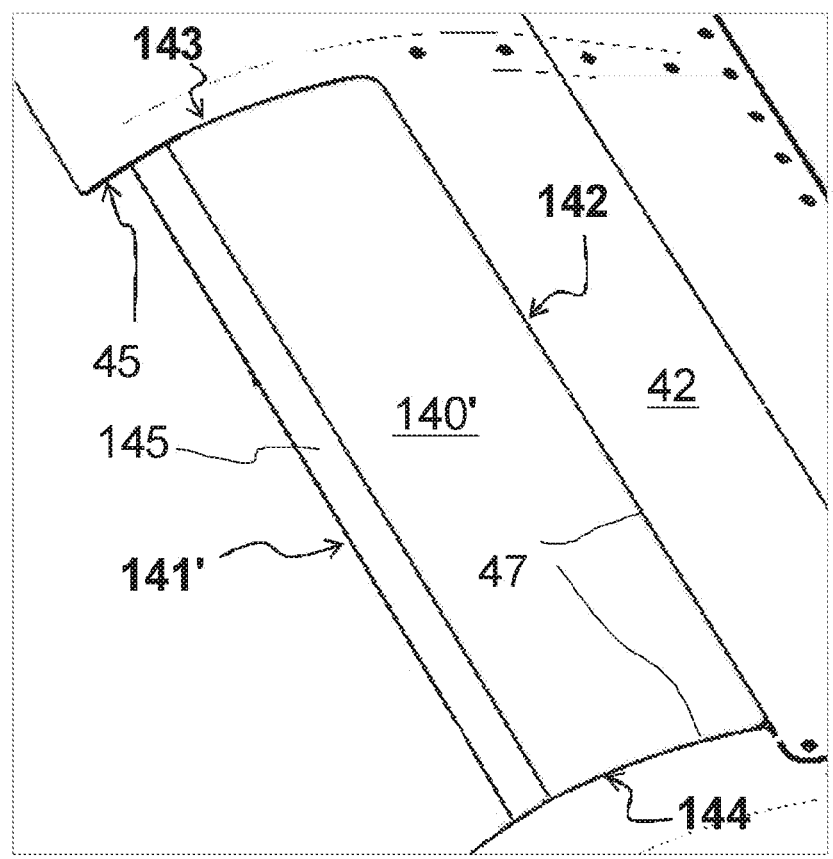
FIG. 9 is a perspective view showing the movable seal according to the second embodiment of the present disclosure which has been mounted to a leading edge of the rudder.

A sealing device 100' according to a second embodiment of the present disclosure will be described below with reference to FIGS. 7A, 7B, 8 and 9, in which FIGS. 7A and 7B are schematic perspective views respectively showing a sealing device according to a second embodiment of the present disclosure with a rubber located at a neutral pivotal position and at a left pivotal limit position, FIG. 8 is a perspective view showing a portion of a movable seal according to the second embodiment of the present disclosure, and FIG. 9 is a perspective view showing the movable seal according to the second embodiment of the present disclosure which has been mounted to a leading edge of the rudder.

For the purpose of conciseness, the main difference between the sealing device 100' according to the second embodiment of the present disclosure and the sealing device 100 according to the first embodiment of the present disclosure will be mainly described below.

The sealing device 100' may include a pushing member 160 (the pushing member 160 is for example made of resin) configured to abut against and push away a movable seal 140' when the rudder 40 moves in the leftward direction (forward direction). Here, it needs to be noted that in the second embodiment, the pushing member 160 corresponds to the avoiding mechanism according to the present disclosure.

In the example shown, the pushing member 160 is attached to the hinge ribs 80 so as to be indirectly connected to the VTP 20. In other examples, although not shown, the pushing member 160 may be directly connected to the VTP 20 (for example to the inner wall surface of the VTP 20).

In the example shown, the pushing member 160 includes a substantially circular-arc hook 162 bent towards the movable wing surface side (rudder side), the hook 162 is adapted to abut against and push away the movable seal 140' by its special hook shape. The pushing member 160 may further include a base 164 and a concave 166, the base 164 may be attached to the hinge ribs 80 (preferably, the base 164 has a large size), and the concave 166 may be located between the base 164 and an terminal end of the hook 162 and is opened towards the side of the movable wing surface. In this way, the pushing member 160 is allowed to be steadily mounted to the hinge ribs 80 by way of the base 164 with a large size, and by providing the concave, the weight of the pushing member 160 is reduced and the hook 162 is easy to be formed. Moreover, by providing the concave, unnecessary damage or wear to the movable seal 140' by the hook 162 is avoided when the movable seal 140' is pushed by the hook 162.

A front edge 141' of the movable seal 140' may be bent so as to have a bent part 145 configured to be abutted by the hook 162 (see FIG. 8). In this way, the movable seal 140 is allowed to be abutted and pushed away reliably by the pushing member 162. In some examples, the movable seal 140' may be made to have the bent part 145 by molding.

With reference to FIG. 9, in the case that the cut-out 45 has a substantially rectangular shape, the movable seal 140' may correspondingly have a substantially rectangular shape and include the front edge 141', a back edge 142 and tow side edges 143, 144. In a preferable example, only the rear edge 142 is fixedly connected to the cut-out edge 47, which defines the cut-out 45, of the leading edge 42 of the rudder 40 (i.e., fixedly connected to a back edge of the cut-out). In this way, it is helpful for the movable seal 140' to be smoothly pushed away by the pushing member 160.

When the rudder 40 moves in the leftward direction from the neutral pivotal position as shown in FIG. 7A, before the movable seal 140' contacts the hinge ribs 80, the hook 162 of the pushing member 160 abuts against the bent part 145 of the movable seal 140' and pushes away the movable seal 140' towards the rear so as to avoid the movable seal 140' from contacting the hinge ribs 80 (see FIG. 7B).

Here, it needs to be noted that the structures of the pushing member 160 and the movable seal 140' are not limited to the forms specifically described above, and may adopt other suitable structural forms. For example, the concave may be omitted in the pushing member 160, and for another example, instead of the hook, a straight pushing part inclined towards the upper right of the FIG. 7A may be provided in the pushing member 160.

The sealing device 100' according to the second embodiment of the present disclosure can achieve substantially the same beneficial technical effects as the sealing device 100 according to the first embodiment of the present disclosure. In addition, in the sealing device 100' according to the second embodiment of the present disclosure, since the contact between the movable seal 140' and the hinge ribs 80 can be avoided, possible negative influences on the hinge ribs 80 due to the contact between the movable seal 140' and the hinge ribs 80 can be avoided completely, and also the movable wing surface is allowed to move to a desired pivotal position more smoothly.

The sealing device according to the present disclosure may allow for a variety of variations, and those variations may achieve certain beneficial technical effects relative to the related technical solutions.

In the first embodiment described above, the movable seal is provided with the dividing part. However, it can be conceived that the movable seal may be provided with no dividing part. In this case, since the flexibility and elasticity of the movable seal itself, the rudder is basically allowed to continue to move to the desired pivotal position in the forward direction.

In the second embodiment described above, only the rear edge is fixedly connected to the cut-out edge, which defines the cut-out, of the leading edge of the rudder. However, it can be conceived that at least a part of the two side edges may be fixedly connected to the cut-out edge. In this case particularly in the case that a part of the two side edges is fixedly connected to cut-out edge), it may be helpful for the movable seal to return to its original state, and also it will not cause an excessive obstacle to the pushing of the movable seal by the pushing member.

In the first and second embodiments described above, the movable seal is used in combination with the cut-out. However, it can be conceived that in the case that the cut-out is not provided, for example, in the case that the size of the leading edge of the rudder in the anterior-posterior direction is reduced to avoid the interference between the leading edge and the hinge ribs, the movable seal may be arranged on the whole leading edge of the rudder along the length wise direction.

In the present application documents, use of the orientation terms "upper", "lower", "left" and "right" and so on is merely for description purpose, and should not be considered as a limitation.

In the present Specification, when referring to "exemplary embodiment", "some examples", "other examples", "preferable example", "example shown" and so on, it means that detailed features, structures or characteristics described in relation to the embodiment/example are included in at least one of the embodiments/examples of the present disclosure, and the appearance of these words in the present disclosure does not necessarily denote the same embodiment/example. In addition, when detailed features, structures or characteristics are described in relation to any of the embodiments/examples, it should be considered that these features, structures or characteristics can also be achieved by the skilled in the art in other embodiments/examples of all of the embodiments/examples.

While the present disclosure has been described with reference to the exemplary embodiments, it should be understood that the present disclosure is not limited to the specific embodiments/examples described and illustrated in detail herein, and those skilled in the art can also make various modifications to the exemplary embodiments without departing from the protection scope defined by the claims.

The invention claimed is:

1. A sealing device for a flight control surface mechanism of an aircraft, the flight control surface mechanism comprising a fixed part and a movable wing surface, the movable wing surface being attached to the fixed part in a manner of being movable relative to the fixed part,
wherein the sealing device comprises a fixed seal attached to the fixed part and a movable seal attached to the movable wing surface so as to move with the movement of the movable wing surface, the movable seal and the fixed seal cooperate with each other in order to provide an aerodynamic sealing for the flight control surface mechanism,
wherein the movable wing surface is arranged behind the fixed part in the aircraft flight direction, the fixed seal is attached to a trailing edge of the fixed part, and the movable seal is attached to a leading edge of the movable wing surface,
wherein a cut-out is provided at the leading edge of the movable wing surface, the movable seal is arranged at the cut-out for enclosing the cut-out.

2. The sealing device according to claim 1, wherein the cut-out has a substantially rectangular shape or a substantially circular-arc shape, and correspondingly the movable seal has a substantially rectangular shape or a substantially circular-arc shape.

3. The sealing device according to claim 1, wherein the fixed seal is attached to the trailing edge of the fixed part at a position corresponding to the cut-out, and wherein the length of the fixed seal in the lengthwise direction of the flight control surface mechanism is greater than the length of the cut-out in the lengthwise direction of the flight control surface mechanism.

4. The sealing device according to claim 1, wherein the sealing size of the fixed seal in the anterior-posterior direction of the flight control surface mechanism is smaller than the sealing size of the movable seal in the anterior-posterior direction of the flight control surface mechanism.

5. The sealing device according to claim 1, wherein the flight control surface mechanism further comprises a hinge and a fixed part-side hinge rib, the hinge allows the movable wing surface to pivot relative to the fixed part, the fixed part-side hinge rib is configured to support the hinge and is fixedly connected to the fixed part, and wherein the cut-out is configured to prevent the movable wing surface and the fixed part-side hinge rib from interfering with each other in the process of the pivotal movement.

6. The sealing device according to claim 1, wherein the movable seal and the fixed seal are made of a flexible material.

7. The sealing device according to claim 1, wherein the sealing size of the fixed seal in the anterior-posterior direction of the flight control surface mechanism and the sealing size of the movable seal in the anterior-posterior direction of the flight control surface mechanism are set such that: even when the movable wing surface moves to a limit position in a direction allowing a corresponding side of the movable wing surface to be away from a corresponding side of the fixed part, the fixed seal and the movable seal are overlapped with each other.

8. The sealing device according to claim 7, wherein the sealing device is arranged such that the fixed seal and the movable seal are spaced apart at a predetermined gap without contacting with each other.

9. The sealing device according to claim 1, wherein the sealing device is provided with an avoiding mechanism, such that in the process of the movement of the movable wing surface relative to the fixed part, the movable seal is able to avoid a corresponding fixing part of the flight control surface mechanism.

10. The sealing device according to claim 9, wherein each of other edges than a front edge of the movable seal is fixedly connected to a cut-out edge, which defines the cut-out, of the leading edge of the movable wing surface.

11. The sealing device according to claim 10, wherein the avoiding mechanism is embodied as a dividing part, which is located at the movable seal and extends from the front edge substantially in the anterior-posterior direction of the flight control surface mechanism.

12. The sealing device according to claim 11, wherein the dividing part is a single dividing part extending over substantially the entire movable seal substantially in the anterior-posterior direction of the flight control surface mechanism, such that the movable seal is divided into a first movable seal and a second movable seal separated from each other, and wherein a divided end of the first movable seal and a divided end of the second movable seal facing to each other are in contact with each other.

13. The sealing device according to claim 1, wherein the flight control surface mechanism is a vertical tail, and wherein the fixed part is a vertical tail plane and the movable wing surface is a rudder.

14. The sealing device according to claim 13, wherein the fixed part comprises a first fixed aerodynamic surface and a second fixed aerodynamic surface substantially symmetrical with respect to a vertical median plane of the flight control surface mechanism, the movable wing surface comprises a first movable aerodynamic surface and a second movable aerodynamic surface substantially symmetrical with respect to the vertical median plane of the flight control surface mechanism, and wherein the sealing device comprises a first sealing device and a second sealing device substantially symmetrical with respect to the vertical median plane of the flight control surface mechanism, the first sealing device is arranged between the first fixed aerodynamic surface and the first movable aerodynamic surface, and the second sealing device is arranged between the second fixed aerodynamic surface and the second movable aerodynamic surface.

15. The sealing device according to claim 14, wherein the first sealing device comprises a plurality of first sealing devices arranged along the lengthwise direction of the flight control surface mechanism, and correspondingly, the second sealing device comprises a plurality of second sealing devices arranged along the lengthwise direction of the flight control surface mechanism.

16. A flight control surface mechanism for an aircraft, wherein the flight control surface mechanism comprises the sealing device according to claim 1.

17. An aircraft, wherein the aircraft comprises the flight control surface mechanism according to claim 16.

18. A sealing device for a flight control surface mechanism of an aircraft, the flight control surface mechanism comprising a fixed part and a movable wing surface, the movable wing surface being attached to the fixed part in a manner of being movable relative to the fixed part,
wherein the sealing device comprises a fixed seal attached to the fixed part and a movable seal attached to the movable wing surface so as to move with the movement of the movable wing surface, the movable seal and the fixed seal cooperate with each other in order to provide an aerodynamic sealing for the flight control surface mechanism,
wherein the movable wing surface is arranged behind the fixed part in the aircraft flight direction, the fixed seal is attached to a trailing edge of the fixed part, and the movable seal is attached to a leading edge of the movable wing surface, wherein the sealing device is provided with an avoiding mechanism, such that in the process of the movement of the movable wing surface relative to the fixed part, the movable seal is able to avoid a corresponding fixing part of the flight control surface mechanism, wherein the avoiding mechanism comprises a pushing member, which is configured to abut against and push away the movable seal when the movable wing surface moves in a direction allowing a corresponding side of the movable wing surface to be close to a corresponding side of the fixed part.

19. The sealing device according to claim 18, wherein:

the pushing member is directly connected to the fixed part, or the flight control surface mechanism further comprises a hinge and a fixed part-side hinge rib, the hinge allows the movable wing surface to pivot relative to the fixed part, the fixed part-side hinge rib is configured to support the hinge and is fixedly connected to the fixed part, and the pushing member is attached to the fixed part-side hinge rib so as to be indirectly connected to the fixed part.

20. The sealing device according to claim 19, wherein the pushing member is attached to the fixed part-side hinge rib, and wherein the pushing member comprises a substantially circular-arc-shaped hook bent towards the side of the movable wing surface, the hook is configured to abut against and push away the movable seal.

21. The sealing device according to claim 20, wherein the pushing member further comprises a base and a concave, the base is attached to the fixed part-side hinge rib, and the concave is located between the base and a terminal end of the hook.

22. The sealing device according to claim 20, wherein a front edge of the movable seal is bent to have a bent part configured to be abutted by the hook.

23. The sealing device according to claim 22, wherein the cut-out has a substantially rectangular shape, and correspondingly the movable seal has a substantially rectangular shape and comprises the front edge, a rear edge and two side edges, and wherein only the rear edge is fixedly connected to a back edge of the cut-out.

* * * * *